US012205748B2

(12) United States Patent
Yen et al.

(10) Patent No.: US 12,205,748 B2
(45) Date of Patent: *Jan. 21, 2025

(54) INDUCTOR DEVICE

(71) Applicant: Realtek Semiconductor Corporation, Hsinchu (TW)

(72) Inventors: Hsiao-Tsung Yen, Hsinchu (TW); Hung-Han Chen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 649 days.

This patent is subject to a terminal disclaimer.

(21) Appl. No.: 17/408,632

(22) Filed: Aug. 23, 2021

(65) Prior Publication Data

US 2022/0059277 A1 Feb. 24, 2022

(30) Foreign Application Priority Data

Aug. 24, 2020 (TW) ................................ 109128807

(51) Int. Cl.
*H01F 27/28* (2006.01)
*H01F 27/29* (2006.01)

(52) U.S. Cl.
CPC ..... *H01F 27/2804* (2013.01); *H01F 27/2823* (2013.01); *H01F 27/29* (2013.01); *H01F 2027/2809* (2013.01)

(58) Field of Classification Search
None
See application file for complete search history.

(56) References Cited

U.S. PATENT DOCUMENTS 6,972,658 B1 * 12/2005 Findley ............... H01F 17/0006 336/200
7,902,953 B1 * 3/2011 Watt ........................ H01F 5/003 336/200
8,325,001 B2 * 12/2012 Huang ................ H01F 17/0013 336/200
2008/0048760 A1 * 2/2008 El Rai ................. H01L 23/5223 327/524
2011/0102093 A1 * 5/2011 El Rai .................. H03B 5/1218 331/117 FE
2015/0364241 A1 * 12/2015 Groves ............... H01F 17/0033 336/200
2017/0098500 A1 * 4/2017 Yen ......................... H01F 27/29
(Continued)

*Primary Examiner* — Mang Tin Bik Lian
(74) *Attorney, Agent, or Firm* — Locke Lord LLP; Tim Tingkang Xia, Esq.

(57) ABSTRACT

An inductor device includes a first trace, a second trace, and a capacitor. The first trace includes a first and a second sub-trace. The first sub-trace includes first wires, and the second sub-trace includes second wires. The second sub-trace is coupled to the first sub-trace at a first node. The first and the second wires are disposed to each other in an interlaced manner, and located at an outer side of the inductor device. The second trace includes a third and a fourth sub-trace. The third sub-trace includes third wires, and the fourth sub-trace includes fourth wires. The fourth sub-trace is coupled to the third sub-trace at a second node. The third and the fourth wires are disposed to each other in an interlaced manner, and located at an outer side of the inductor device. The capacitor is coupled between the first and the second node.

20 Claims, 6 Drawing Sheets

(56) References Cited

U.S. PATENT DOCUMENTS

| | | | | |
|---|---|---|---|---|
| 2018/0254313 | A1* | 9/2018 | Huang | H01L 23/528 |
| 2018/0330872 | A1* | 11/2018 | Yen | H01F 27/2823 |
| 2019/0279809 | A1* | 9/2019 | Yen | H01F 17/0006 |
| 2020/0312530 | A1* | 10/2020 | Yen | H01F 27/2828 |
| 2021/0074465 | A1 | 3/2021 | Yen et al. | |
| 2021/0074466 | A1 | 3/2021 | Yen et al. | |

* cited by examiner

INDUCTOR DEVICE

RELATED APPLICATIONS

This application claims priority to and the benefit of Taiwan Application Serial Number 109128807, filed on Aug. 24, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

Radio frequency (RF) devices generate second harmonic, third harmonic, etc. during operation. The harmonics cause negative effect to other circuits. For example, second harmonic of 2.4 GHz circuit is near 5 GHz, and 5 GHz signal causes negative effect to system on chip (SoC).

Conventional way to solve negative effect caused by harmonics is that a filter will be disposed outside of a circuit for filtering the harmonics. However, the filter disposed outside of the circuit will affect function of the circuit and generates additional costs.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first trace, a second trace, and a capacitor. The first trace includes a first sub-trace and a second sub-trace. The first sub-trace includes a plurality of first wires, and the second sub-trace includes a plurality of second wires. The second sub-trace is coupled to one terminal of the first sub-trace at a first node. The first wires and the second wires are disposed to each other in an interlaced manner, and located at an outer side of the inductor device. The second trace includes a third sub-trace and a fourth sub-trace. The third sub-trace includes a plurality of third wires, and the fourth sub-trace includes a plurality of fourth wires. The fourth sub-trace is coupled to one terminal of the third sub-trace at a second node. The third wires and the fourth wires are disposed to each other in an interlaced manner, and located at an outer side of the inductor device. The capacitor is coupled between the first node and the second node.

Therefore, based on the technical content of the present disclosure, the capacitor of the inductor device brings a function to filter low frequency, such that low frequency signal induced at the inductor device cannot pass but high frequency signal can pass the capacitor directly. Low frequency signal is, for example, a signal that uses 2.4 GHz as main operating frequency. An induced signal caused by the main operating frequency can be canceled by the folded inductor of the inductor device. Therefore, the folded inductor will not affect the characteristic of the operating frequency of the inductor. If an inductor which is located at the center of the inductor device has a high frequency signal, for example, a second harmonic (e.g., 5 GHz signal), the high frequency signal may pass the capacitor and form an inductive inductor which is a circle flows through the folded inductor and the capacitor. Therefore, a 5 GHz harmonic signal corresponding to 2.4 GHz signal is induced in the inductor device of the present disclosure. The 5 GHz signal can be used in the circuit. For example, the 5 GHz signal can be amplified and then the amplified 5 GHz signal is used to cancel the 5 GHz harmonic signal of the operating frequency. The amplifying circuit can be arranged by a designer who is familiar with circuit design. As a result, a negative effect to a 5 GHz circuit can be reduced. In addition, since the filter is disposed inside the inductor device of the present disclosure, there is no need to dispose a filter outside of the inductor device, so as to prevent an outer filter from affecting the circuit or prevent additional costs.

It is to be understood that both the foregoing general description and the following detailed description are by examples, and are intended to provide further explanation of the invention as claimed.

BRIEF DESCRIPTION OF THE DRAWINGS

The accompanying drawings are comprised to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall comprise plural forms of the same and plural terms shall comprise the singular. Specifically, as used herein and in the claims, the singular forms "a" and "an" comprise the plural reference unless the context clearly indicates otherwise.

Figure 1:
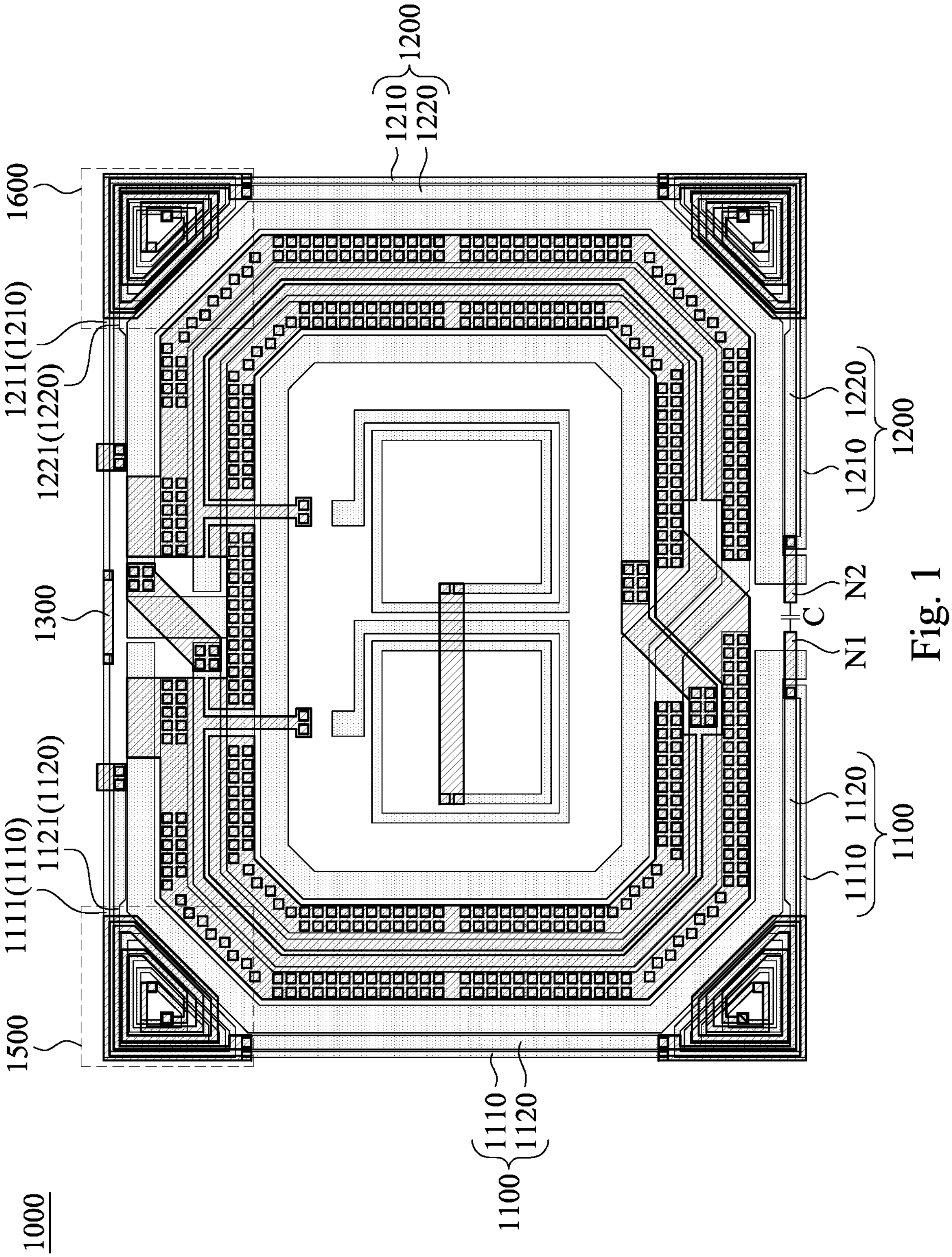
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first trace 1100, a second trace 1200, and a capacitor C. In addition, the first trace 1100 includes a first sub-trace 1110, and a second sub-trace 1120. One terminal of the first sub-trace 1110 and one terminal of the second sub-trace 1120 are coupled at a first node N1. The second trace 1200 includes a third sub-trace 1210 and a fourth sub-trace 1220. One terminal of the third sub-trace 1210 and one terminal of the fourth sub-trace 1220 are coupled at a second node N2. The capacitor C is coupled between the first node N1 and the second node N2.

Figure 2:
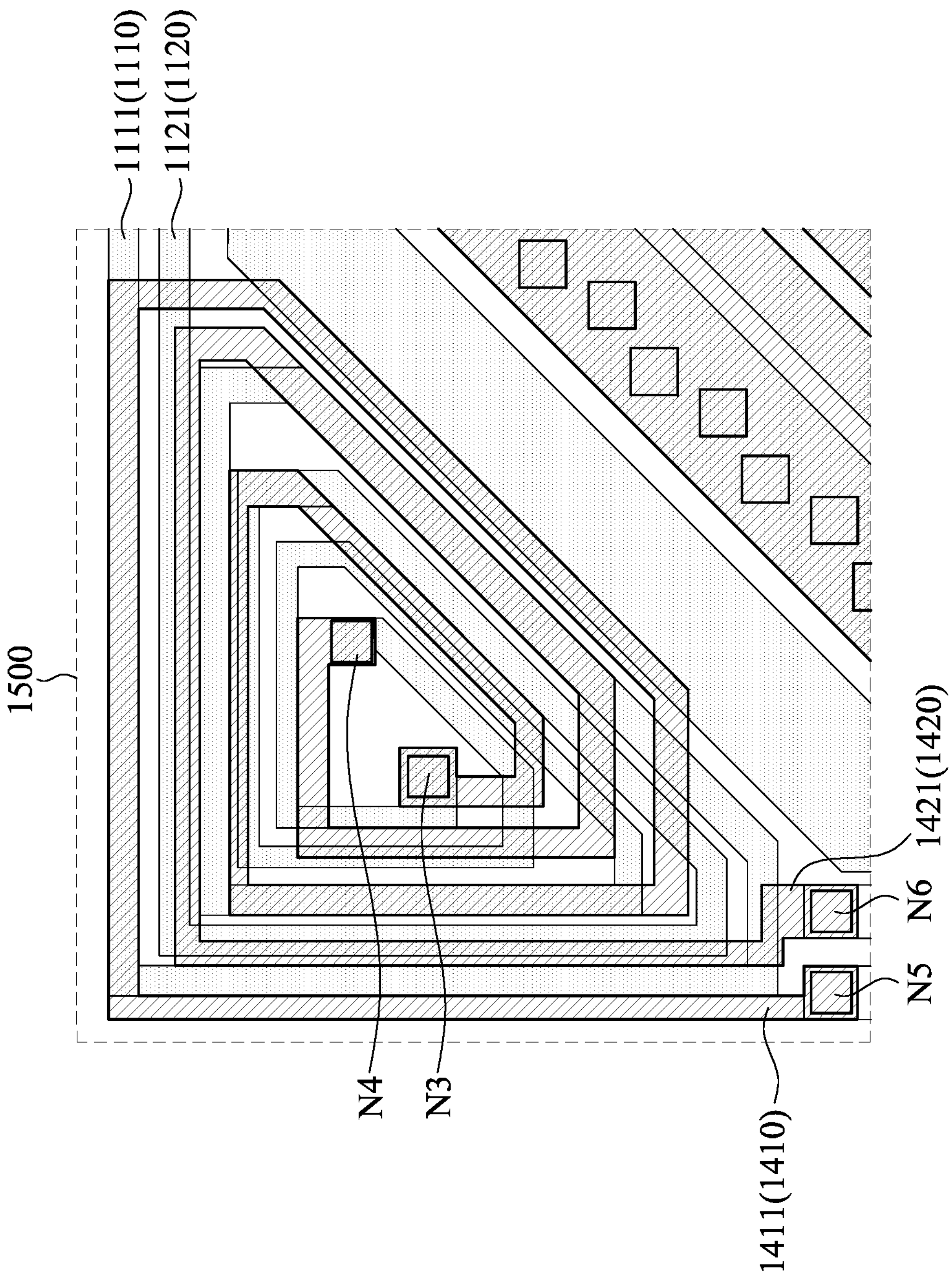
FIG. 2 depicts a schematic diagram of a partial structure of the inductor device shown in FIG. 1 according to one embodiment of the present disclosure.

FIG. 2 depicts a schematic diagram of a partial structure 1500 of the inductor device 1000 shown in FIG. 1 according to one embodiment of the present disclosure. As shown in the figure, the first sub-trace 1110 includes a plurality of first wires 1111. The second sub-trace 1120 includes a plurality of second wires 1121. The first wires 1111 and the second wires 1121 are disposed to each other in an interlaced manner, and located at an outer side of the inductor device 1000. For example, the first sub-trace 1110 is winded to form the first wires 1111, and the second sub-trace 1120 is winded to form the second wires 1121. The first wires 1111 and the second wires 1121 are disposed to each other in an interlaced manner, for example, a sequence of the wires are "the first wire 1111, the second wire 1121, the first wire 1111, the second wire 1121 . . . etc." Reference is now made to both FIG. 1 and FIG. 2, the first wires 1111 and the second wires 1121 are located in the partial structure 1500, and the partial structure 1500 is located at an outer side (or a periphery) of the inductor device 1000.

Similarly, reference is now made to the partial structure 1600 in the upper right corner in FIG. 1, the third sub-trace 1210 includes a plurality of third wires 1211, and the fourth sub-trace 1220 includes a plurality of fourth wires 1221. The connection structure and the disposition manner of the third wires 1211 and the fourth wires 1221 are the same as that of the first wires 1111 and the second wires 1121. Therefore, the connection structure and the disposition manner regarding the third wires 1211 and the fourth wires 1221 are omitted herein for the sake of brevity.

It is noted that, there are partial structures, which are similar to the partial structure 1500 and the partial structure 1600, in the lower left corner and the lower right corner in the inductor device 1000 shown in FIG. 1. Similarly, the connection structure and the disposition manner of those partial structures are the same as that of the first wires 1111 and the second wires 1121. Therefore, the connection structure and the disposition manner regarding those partial structures are omitted herein for the sake of brevity.

In one embodiment, the first sub-trace 1110 and the second sub-trace 1120 all include a first terminal and a second terminal. As shown in the figure, the second terminal (e.g., the lower terminal) of the first sub-trace 1110 and the second terminal (e.g., the lower terminal) of the second sub-trace 1120 are coupled at the first node N1. For example, the first terminal of the first sub-trace 1110 is located at the upper side of the figure, and the first sub-trace 1110 is winded toward the left side of the figure. Subsequently, the first sub-trace 1110 is winded toward the lower side of the figure along the left side. In addition, after it reaches the lower left side of the figure, the first sub-trace 1110 is winded toward the node N1 located at the lower side of the figure, and the second terminal of the first sub-trace 1110 is finally coupled to the Node N1. At the node N1, the second terminal of the second sub-trace 1120 is coupled to the node N1, and the second sub-trace 1120 is winded toward the left side of the figure. Subsequently, the second sub-trace 1120 is winded toward the upper side of the figure along the left side. In addition, after it reaches the upper left side of the figure, the second sub-trace 1120 is winded toward the connection member 1300 located at the upper side of the figure, and the second sub-trace 1120 is winded toward the first terminal of the second sub-trace 1120 located at the upper side. It is noted from the above-mentioned structure, the first sub-trace 1110 and the second sub-trace 1120 form a folded inductor.

Besides, the third sub-trace 1210 and the fourth sub-trace 1220 all include a first terminal and a second terminal. As shown in the figure, the second terminal (e.g., the lower terminal) of the third sub-trace 1210 and the second terminal (e.g., the lower terminal) of the fourth sub-trace 1220 are coupled at the second node N2. For example, the first terminal of the third sub-trace 1210 is located at the upper terminal of the figure, and the third sub-trace 1210 is winded toward the right side of the figure. Subsequently, the third sub-trace 1210 is winded toward the lower side of the figure along the right side. In addition, after it reaches the lower right side of the figure, the third sub-trace 1210 is winded toward the node N2 located at the lower side of the figure, and the second terminal of the third sub-trace 1210 is finally coupled to the node N2. At the node N2, the second terminal of the fourth sub-trace 1220 is coupled to the node N2, and the fourth sub-trace 1220 is winded toward the right side of the figure. Subsequently, the fourth sub-trace 1220 is winded toward the upper side of the figure along the right side. In addition, after it reaches the upper right side of the figure, the fourth sub-trace 1220 is winded toward the connection member 1300 located at the upper side of the figure, and the fourth sub-trace 1220 is winded toward the first terminal of the fourth sub-trace 1220 located at the upper side of the figure. Similarly, it is noted from the above-mentioned structure, the third sub-trace 1210 and the fourth sub-trace 1220 form a folded inductor. In one embodiment, the first terminal of the third sub-trace 1210 is coupled to the first terminal of the first sub-trace 1110 through the connection member 1300.

Referring to FIG. 2, the first trace 1110 further includes a fifth sub-trace 1410 and a sixth sub-trace 1420. The fifth sub-trace 1410 includes a plurality of fifth wires 1411. The fifth wire 1411 is located above the first wires 1111, and coupled to the first wires 1111. For example, one terminal of the fifth wires 1411 and one terminal of the first wires 1111 are coupled to each other at a node N3 which is located at an innermost side of the fifth wires 1411. Another terminal of the fifth wires 1411 and another terminal of the first wires 1111 are coupled to each other at a node N5 which is located at an outermost side of the fifth wires 1411.

Besides, the sixth sub-trace 1420 includes a plurality of sixth wires 1421. The sixth wires 1421 is located above the second wires 1121, and coupled to the second wires 1121.

The fifth wires 1411 and the sixth wires 1421 are disposed to each other in an interlaced manner, and located at an outer side of the inductor device 1000. For example, one terminal of the sixth wires 1421 and one terminal of the second wires 1121 are coupled at a node N4 which is located at an innermost side of the sixth wires 1421. Another terminal of the sixth wires 1421 and another terminal of the second wires 1121 are coupled at a node N6 which is located at an outermost side of the sixth wires 1421.

In one embodiment, the first wires 1111 and the second wires 1121 are located on the first layer, and the fifth wires 1411 and the sixth wires 1421 are located on the second layer. For example, the fifth wires 1411 and the sixth wires 1421 are located above the first wires 1111 and the second wires 1121. However, the present disclosure is not intended to be limited to the structure shown in FIG. 2, and the fifth wires 1411 and the sixth wires 1421 can be located below the first wires 1111 and the second wires 1121 depending on actual requirements.

In another embodiment, as shown in FIG. 2, the first wires 1111 and the fifth wire 1411 are overlapped to each other partially. Besides, the second wires 1121 and the sixth wires 1421 are overlapped to each other partially. In addition, from another point of view, the first wires 1111 and the sixth wires 1421 are overlapped to each other partially. Furthermore, the second wires 1121 and the fifth wire 1411 are overlapped to each other partially.

It is noted that, the present disclosure is not limited to the structure as shown in FIG. 1 and FIG. 2, and it is merely an example for illustrating one of the implements of the present disclosure.

Figure 3:
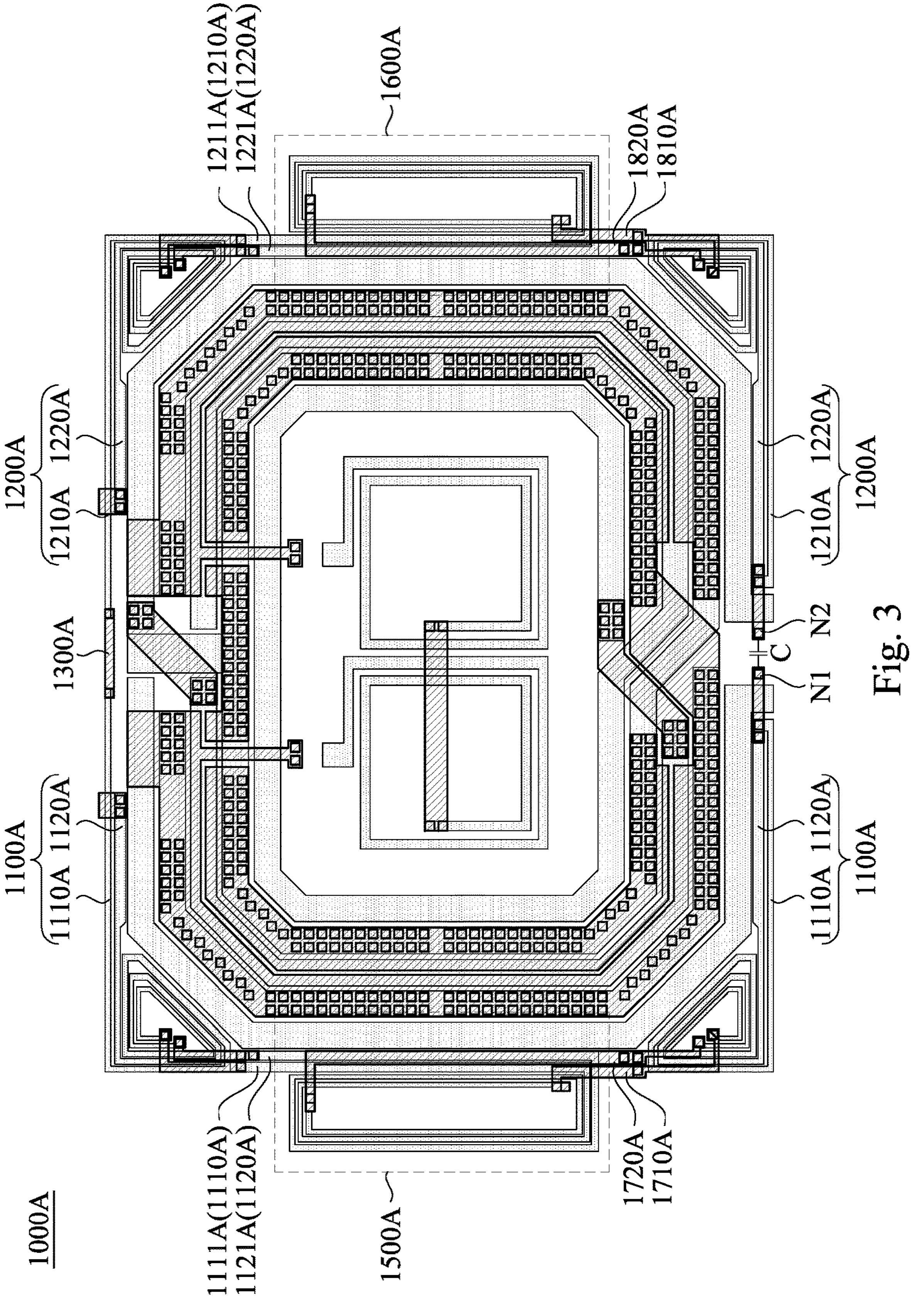
FIG. 3 depicts a schematic diagram of an inductor device according to one embodiment of the present disclosure.
Figure 4:
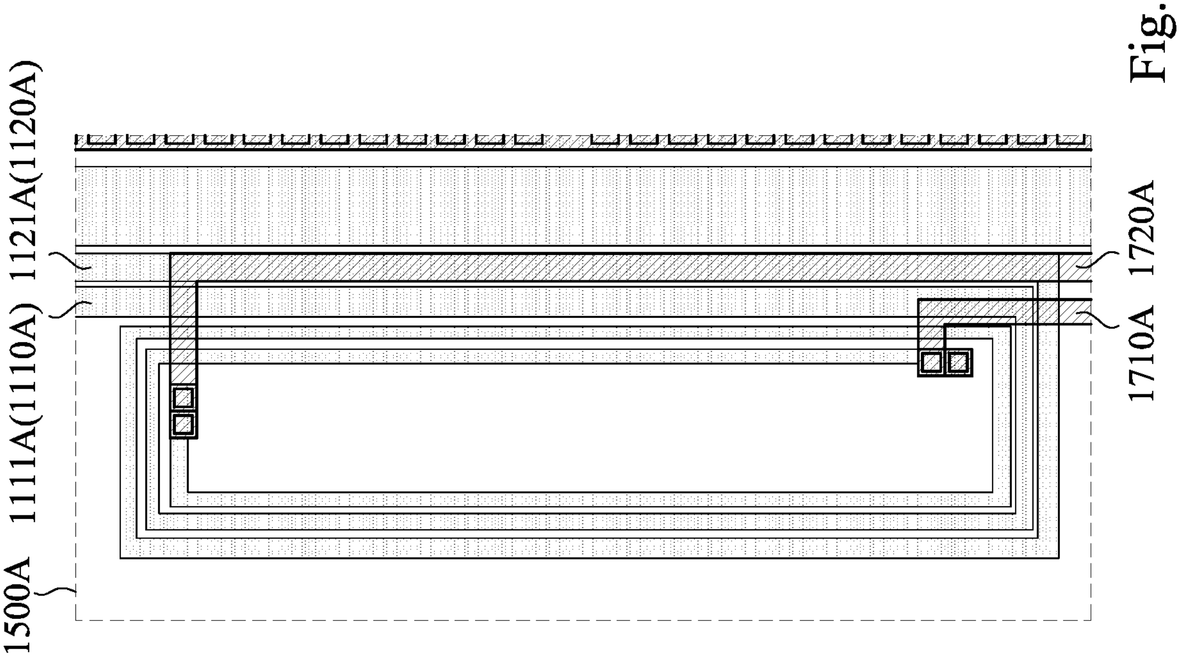
FIG. 4 depicts a schematic diagram of a partial structure of the inductor device shown in FIG. 3 according to one embodiment of the present disclosure.

FIG. 3 depicts a schematic diagram of an inductor device 1000A according to one embodiment of the present disclosure. FIG. 4 depicts a schematic diagram of a partial structure of the inductor device 1000A shown in FIG. 3 according to one embodiment of the present disclosure. It is noted that, compared to the inductor device 1000 shown in FIG. 1, the disposition of the first wires 1111A, the second wires 1121A, the third wires 1211A, and the fourth wires 1221A of the inductor device 1000A shown in FIG. 3 and FIG. 4 is different. Reference is now made to FIG. 3 and FIG. 4, the first wires 1111A and the second wires 1121A are disposed at a first side of the inductor device 1000A, and the third wires 1211A and the fourth wires 1221A are disposed at a second side of the inductor device 1000A. In one embodiment, the first side and the second side are located at two sides of the inductor device 1000A which are opposite to each other. For example, the first wires 1111A and the second wires 1121A are located at the left side of the inductor device 1000A, and the third wires 1211A and the fourth wires 1221A are located at the right side of the inductor device 1000A.

Referring to both FIG. 3 and FIG. 4, in one embodiment, the inductor device 1000A further includes a first connection member 1710A and a second connection member 1720A. The first connection member 1710A is coupled to the first sub-trace 1110A and the first wires 1111A. The second connection member 1720A is coupled to the second sub-trace 1120A and the second wires 1121A. In another embodiment, the first sub-trace 1110A and the second sub-trace 1120A are located on the first layer, and the first connection member 1710A and the second connection member 1720A are located on the second layer. For example, the first connection member 1710A and the second connection member 1720A are located above the first sub-trace 1110A and the second sub-trace 1120A. However, the present disclosure is not intended to be limited to the structure shown in FIG. 2, and the first connection member 1710A and the second connection member 1720A can be located below the first sub-trace 1110A and the second sub-trace 1120A depending on actual requirements.

In one embodiment, the inductor device 1000A further includes a third connection member 1810A and a fourth connection member 1820A. The third connection member 1810A is coupled to the third sub-trace 1210A and the third wires 1211A. The fourth connection member 1820A is coupled to the fourth sub-trace 1220A and the fourth wires 1221A. In another embodiment, the third sub-trace 1210A and the fourth sub-trace 1220A are located on the first layer, and the third connection member 1810A and the fourth connection member 1820A are located on the second layer. For example, the third connection member 1810A and the fourth connection member 1820A are located above the third sub-trace 1210A and the fourth sub-trace 1220A. However, the present disclosure is not intended to be limited to the structure shown in FIG. 2, and the third connection member 1810A and the fourth connection member 1820A can be located below the third sub-trace 1210A and the fourth sub-trace 1220A depending on actual requirements.

It is noted that, the element in FIG. 3 and FIG. 4, whose symbol is similar to the symbol of the element in FIG. 1 and FIG. 2, has similar structure feature in connection with the element in FIG. 1 and FIG. 2. Therefore, a detail description regarding the structure feature of the element in FIG. 3 and FIG. 4 is omitted herein for the sake of brevity. Moreover, the present disclosure is not limited to the structure as shown in FIG. 3 and FIG. 4, and it is merely an example for illustrating one of the implements of the present disclosure.

Figure 5:
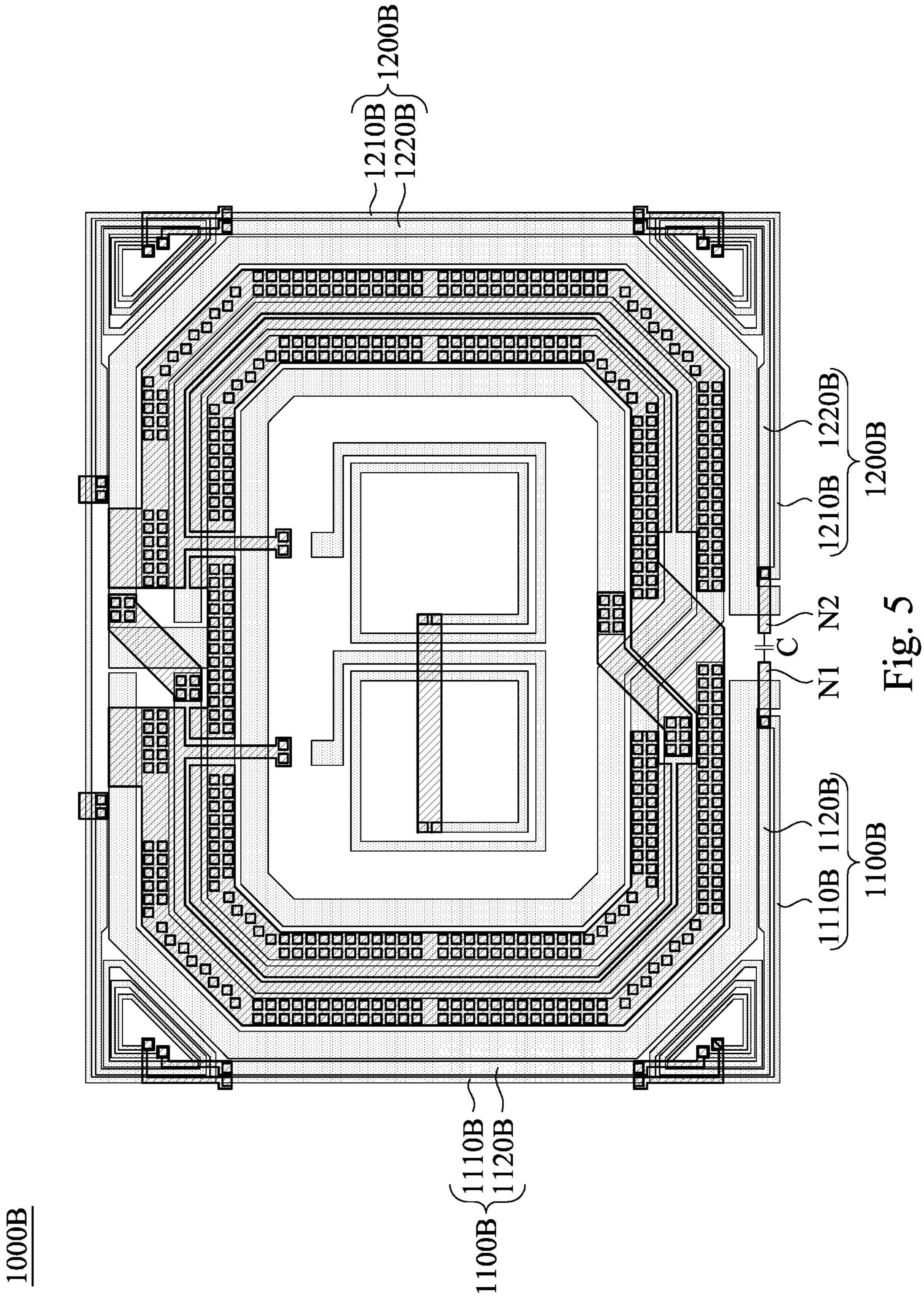
FIG. 5 depicts a schematic diagram of an inductor device according to one embodiment of the present disclosure.

FIG. 5 depicts a schematic diagram of an inductor device 1000B according to one embodiment of the present disclosure. It is noted that, compared to the inductor device 1000 shown in FIG. 1 and the inductor device 1000A shown in FIG. 3, the disposition of the first sub-trace 1110B, the second sub-trace 1120B, the third sub-trace 1210B, and the fourth sub-trace 1210B of the inductor device 1000B shown in FIG. 5 is different. For example, the inductor device 1000B shown in FIG. 5 does not have the fifth sub-trace 1410 and the sixth sub-trace 1420 in the partial structure 1500 in the inductor device 1000 shown in FIG. 1. Besides, the inductor device 1000B shown in FIG. 5 does not have the partial structure 1500A and the partial structure 1600A shown in FIG. 3.

It is noted that, the element in FIG. 5, whose symbol is similar to the symbol of the element in FIG. 1 and FIG. 3, has similar structure feature in connection with the element in FIG. 1 and FIG. 3. Therefore, a detail description regarding the structure feature of the element in FIG. 5 is omitted herein for the sake of brevity. Moreover, the present disclosure is not limited to the structure as shown in FIG. 5, and it is merely an example for illustrating one of the implements of the present disclosure.

Figure 6:
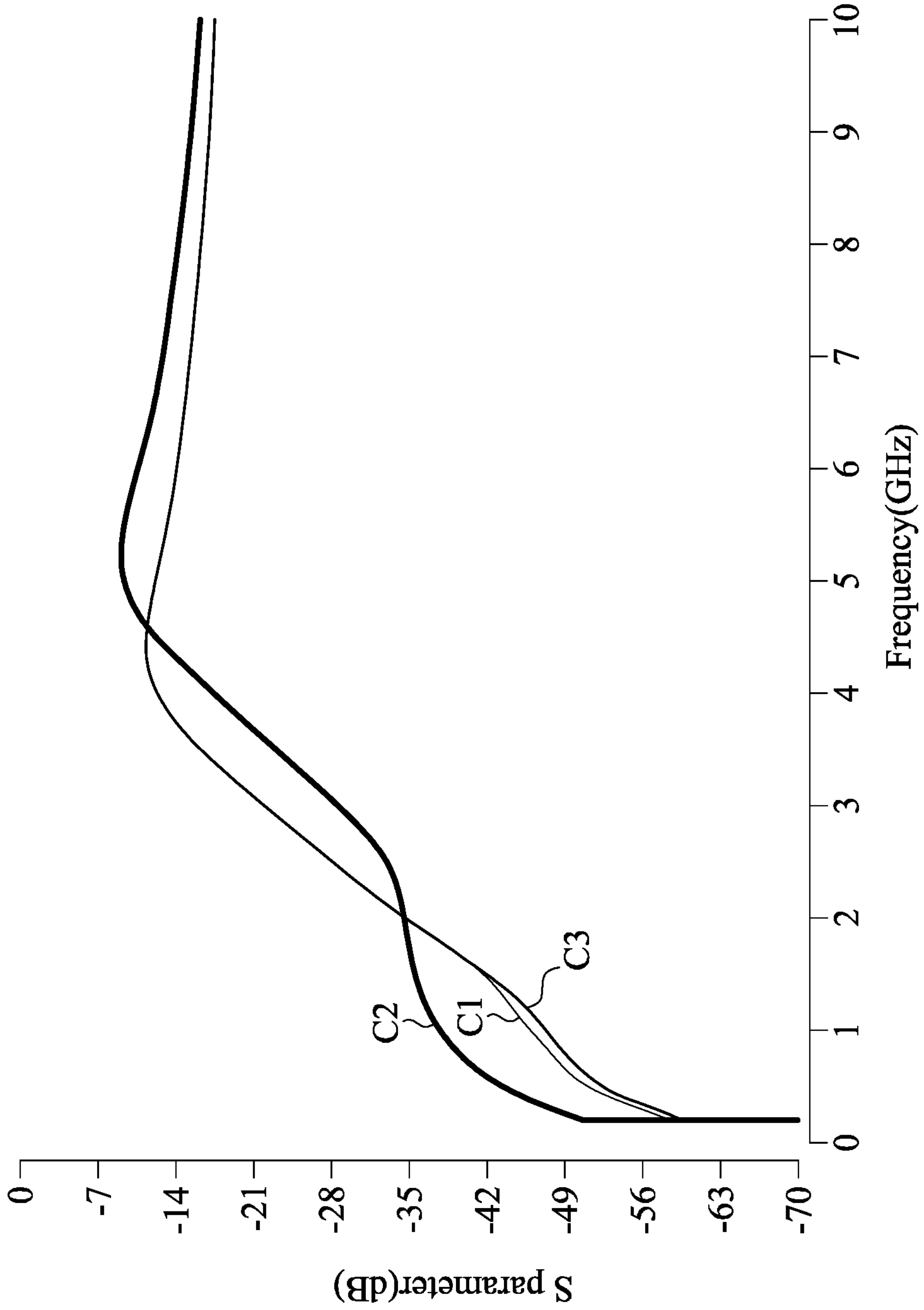
FIG. 6 depicts a schematic diagram of experimental data of an inductor device according to one embodiment of the present disclosure.

FIG. 6 depicts a schematic diagram of experimental data of an inductor device according to one embodiment of the present disclosure. As shown in the figure, the experimental curves of S parameter of the inductor devices of the present disclosure are C1, C2, C3. The curve C1 is an experimental curve of the inductor device 1000 shown in FIG. 1. The curve C2 is an experimental curve of the inductor device 1000A shown in FIG. 3. The curve C3 is an experimental curve of the inductor device 1000B shown in FIG. 5. As can be seen in the figure, the curve C1, the curve C2, or the curve C3 show that the inductor devices in the present disclosure may filter signals around 2.4 GHz and let signals around 5 GHz pass. Furthermore, as shown in the figure, the difference between the S parameter at 2.4 GHz and the S parameter at 5 GHz is 25 dB, which proves that the inductor devices in the present disclosure have a strong filtering ability.

It can be understood from the embodiments of the present disclosure that application of the present disclosure has the following advantages. The inductor device of the present disclosure may induce high frequency signal (e.g., second harmonic) of inductor inside the inductor device. After the high frequency signal is amplified by additional circuit, the amplified high frequency signal is able to cancel negative effect to the circuit caused by second harmonic. For example, the capacitor of the inductor device is used to let high frequency signal pass and block low frequency signal. Therefore, the inductor device is able to deal with signals in high frequency or low frequency by two kinds of inducing manner. In addition, since the filter is disposed inside integrated circuit (IC), for example, the inductor device, of the present disclosure, there is no need to dispose a filter outside of the inductor device, so as to prevent an outer filter from affecting the circuit or prevent additional costs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace, comprising:

a first sub-trace, comprising a plurality of first wires; and a second sub-trace, comprising a plurality of second wires, and coupled to the first sub-trace at a first node, wherein the first wires and the second wires are disposed to each other in an interlaced manner, and located at an outer side of the inductor device;

a second trace, comprising:

a third sub-trace, comprising a plurality of third wires; and a fourth sub-trace, comprising a plurality of fourth wires, and coupled to the third sub-trace at a second node, wherein the third wires and the fourth wires are disposed to each other in an interlaced manner, and located at an outer side of the inductor device; and a capacitor, coupled between the first node and the second node.

2. The inductor device of claim 1, wherein the second sub-trace is coupled to the first sub-trace at the first node.

3. The inductor device of claim 2, wherein the fourth sub-trace is coupled to the the third sub-trace at the second node.

4. The inductor device of claim 3, wherein the first trace further comprises:

a fifth sub-trace, comprising:

a plurality of fifth wires, located above the first wires, and coupled to the first wires; and a sixth sub-trace, comprising:

a plurality of sixth wires, located above the second wires, and coupled to the second wires, wherein the fifth wires and the sixth wires are disposed to each other in an interlaced manner, and located at an outer side of the inductor device.

5. The inductor device of claim 4, wherein the first wires and the second wires are located on a first layer, and the fifth wires and the sixth wires are located on a second layer.

6. The inductor device of claim 5, wherein the fifth wires and the first wires are coupled to each other at an innermost side of the fifth wires.

7. The inductor device of claim 6, wherein the fifth wires and the first wires are coupled to each other at an outermost side of the fifth wires.

8. The inductor device of claim 7, wherein the sixth wires and second wires are coupled to each other at an innermost side of the sixth wires.

9. The inductor device of claim 8, wherein the sixth wires and the second wires are coupled to each other at an outermost side of the sixth wires.

10. The inductor device of claim 9, wherein the first wires and the fifth wires are overlapped to each other partially.

11. The inductor device of claim 10, wherein the second wires and the sixth wires are overlapped to each other partially.

12. The inductor device of claim 11, wherein the first wires and the sixth wires are overlapped to each other partially.

13. The inductor device of claim 12, wherein the second wires and the fifth wires are overlapped to each other partially.

14. The inductor device of claim 1, wherein the first wires and the second wires are disposed at a first side of the inductor device, and the third wires and the fourth wires are disposed at a second side of the inductor device.

15. The inductor device of claim 14, wherein the first side and the second side are located at two sides of the inductor device which are opposite to each other.

16. The inductor device of claim 15, further comprising:

a first connection member, coupled to the first sub-trace and the first wires; and a second connection member, coupled to the second sub-trace and the second wires.

17. The inductor device of claim 16, wherein the first sub-trace and the second sub-trace are located on a first layer, and the first connection member and the second connection member are located on a second layer.

18. The inductor device of claim 16, further comprising:

a third connection member, coupled to the third sub-trace and the third wires; and a fourth connection member, coupled to the fourth sub-trace and the fourth wires.

19. The inductor device of claim 18, wherein the third sub-trace and the fourth sub-trace are located on the first layer, and the third connection member and the fourth connection member are located on the second layer.

20. The inductor device of claim 19, wherein the first layer is different from the second layer.

* * * * *